United States Patent
Shin et al.

(10) Patent No.: US 10,396,837 B2
(45) Date of Patent: Aug. 27, 2019

(54) ELECTRONIC DEVICE INCLUDING ANTENNA

(71) Applicant: Samsung Electronics Co., Ltd., Gyeonggi-do (KR)

(72) Inventors: Yong Joo Shin, Gyeonggi-do (KR); Ju Ho Van, Seoul (KR); Young Ju Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/775,507

(22) PCT Filed: Nov. 3, 2016

(86) PCT No.: PCT/KR2016/012587
§ 371 (c)(1),
(2) Date: May 11, 2018

(87) PCT Pub. No.: WO2017/082585
PCT Pub. Date: May 18, 2017

(65) Prior Publication Data
US 2018/0351589 A1 Dec. 6, 2018

(30) Foreign Application Priority Data

Nov. 13, 2015 (KR) ........................ 10-2015-0159948

(51) Int. Cl.
*H04B 1/40* (2015.01)
*H04B 1/04* (2006.01)
(Continued)

(52) U.S. Cl.
CPC ............. *H04B 1/0483* (2013.01); *H01Q 1/24* (2013.01); *H01Q 1/243* (2013.01); *H01Q 5/335* (2015.01);
(Continued)

(58) Field of Classification Search
CPC .......... H01Q 1/243; H01Q 9/42; H01Q 5/364; H01Q 1/24; H01Q 5/357; H01Q 9/0414;
(Continued)

(56) References Cited

U.S. PATENT DOCUMENTS

| 7,924,226 B2 | 4/2011 | Soler Castany et al. |
| 8,564,485 B2 | 10/2013 | Milosavljevic et al. |

(Continued)

FOREIGN PATENT DOCUMENTS

| KR | 1020070098021 | 10/2007 |
| KR | 1020080034963 | 4/2008 |

(Continued)

OTHER PUBLICATIONS

European Search Report dated Jul. 27, 2018 issued in counterpart application No. 16864511.7-1205, 7 pages.

(Continued)

*Primary Examiner* — Nhan T Le
(74) *Attorney, Agent, or Firm* — The Farrell Law Firm, P.C.

(57) ABSTRACT

An electronic device includes an antenna including a ground part, a feeding part, and a radiator and a first switch interposed between the feeding part and the radiator. A signal supplied through the feeding part is transmitted through a first path, a second path, or a third path that connects the feeding part to the radiator. The first switch is configured to change a connection state of the second path and the third path, and the third path includes a variable capacitor.

14 Claims, 16 Drawing Sheets

(51) Int. Cl.
  *H01Q 1/24*  (2006.01)
  *H01Q 9/04*  (2006.01)
  *H01Q 9/42*  (2006.01)
  *H01Q 5/335* (2015.01)
  *H01Q 5/364* (2015.01)
  *H04B 1/00*  (2006.01)

(52) U.S. Cl.
  CPC ............... *H01Q 5/364* (2015.01); *H01Q 9/04* (2013.01); *H01Q 9/42* (2013.01); *H04B 1/006* (2013.01)

(58) Field of Classification Search
  CPC .......... H04B 1/48; H04B 1/44; H04B 7/0602; H04B 1/006; H04B 1/0483; H04B 1/18
  See application file for complete search history.

(56) References Cited

U.S. PATENT DOCUMENTS

| | | | |
|---|---|---|---|
| 8,610,632 | B2 | 12/2013 | Zhang et al. |
| 8,614,646 | B2 | 12/2013 | Zhang et al. |
| 9,325,076 | B2 | 4/2016 | Bishop et al. |
| 9,960,489 | B2 | 5/2018 | Kim et al. |
| 2008/0062049 | A1 | 3/2008 | Soler Castany et al. |
| 2009/0231220 | A1 | 9/2009 | Zhang et al. |
| 2010/0295737 | A1 | 11/2010 | Milosavljevic et al. |
| 2012/0119955 | A1 | 5/2012 | Milosavljevic et al. |
| 2012/0212382 | A1 | 8/2012 | Zhang et al. |
| 2013/0271330 | A1 | 10/2013 | Bishop et al. |
| 2014/0306855 | A1 | 10/2014 | Tsai et al. |
| 2015/0054701 | A1* | 2/2015 | Kim ............... H01Q 9/0442 343/750 |
| 2016/0036127 | A1* | 2/2016 | Desclos ............ H01Q 5/328 343/745 |
| 2016/0056535 | A1* | 2/2016 | Sakong ............ H01Q 1/243 343/845 |
| 2016/0226132 | A1* | 8/2016 | Kim ............... H01Q 1/243 |
| 2017/0170562 | A1* | 6/2017 | Lee ................ H01Q 1/243 |
| 2018/0062244 | A1* | 3/2018 | Huang .............. H01Q 5/10 |

FOREIGN PATENT DOCUMENTS

| | | |
|---|---|---|
| KR | 1020100128310 | 12/2010 |
| KR | 1020120053541 | 5/2012 |
| KR | 1020140008209 | 1/2014 |
| KR | 1020150027682 | 3/2015 |
| WO | WO 2014/165320 | 10/2014 |

OTHER PUBLICATIONS

PCT/ISA/210 Search Report issued on PCT/KR2016/012587 (pp. 3).

PCT/ISA/237 Written Opinion issued on PCT/KR2016/012587 (pp. 7).

* cited by examiner

ELECTRONIC DEVICE INCLUDING ANTENNA

PRIORITY

This application is a National Phase Entry of PCT International Application No. PCT/KR2016/012587 which was filed on Nov. 3, 2016, and claims priority to Korean Patent Application No. 10-2015-0159948, which was filed on Nov. 13, 2015, the content of each of which is incorporated herein by reference.

TECHNICAL FIELD

The present disclosure relates to a technology for extending a frequency band that an antenna supports.

BACKGROUND ART

With developments of information communication technologies, network devices such as a base station and the like are installed throughout the country. The electronic device receives and transmits data from and to another electronic device through a network, thereby allowing a user to utilize the network freely anywhere in the country.

However, an antenna is essentially needed to use the network. Along with the development of information communication technology, an antenna technology has been developed. Recently, one electronic device has performed communication using a plurality of frequency bands.

DETAILED DESCRIPTION OF THE INVENTION

Technical Problem

If the antenna for the simultaneous service of a low-band (about 600 MHz to about 1000 MHz) and a mid-band (about 1700 MHz to about 2200 MHz) based on carrier aggregation (CA) changes the resonance frequency in the low band, the performance of the antenna in the mid-band may degraded. In addition, in the case of the above-described antenna, a complex structure may be required to change the resonance frequency in the low-band, and thus the loss of a signal may increase.

To solve the above-mentioned problems and tasks issued in this disclosure, embodiments disclosed in the present disclosure may provide an electronic device including an antenna structure capable of improving performance in a low-band frequency while preventing performance degradation in a mid-band frequency.

Technical Solution

An electronic device includes an antenna including a ground part, a feeding part, and a radiator and a first switch interposed between the feeding part and the radiator. A signal supplied through the feeding part is transmitted through a first path, a second path, or a third path that connects the feeding part to the radiator. The first switch is configured to change a connection state of the second path and the third path, and the third path includes a variable capacitor.

Other aspects, advantages, and salient features of the disclosure will become apparent to those skilled in the art from the following detailed description, which, taken in conjunction with the annexed drawings, discloses various embodiments of the present disclosure.

Advantageous Effects of the Invention

According to various embodiments of the present disclosure, the resonance frequency in a low-band may be variously changed, by changing an electrical length of a path, through which a signal passes, using a variable capacitor.

Furthermore, the degradation of the performance of an antenna in a mid-band frequency may be prevented, by changing an electrical length of a path, through which a signal passes, using a switch.

In addition, the structure of the antenna may be simplified and signal loss may be prevented by implementing a multi-band antenna using one variable capacitor and one switch.

Besides, a variety of effects directly or indirectly understood through this disclosure may be provided.

BEST MODE

Figure 1:
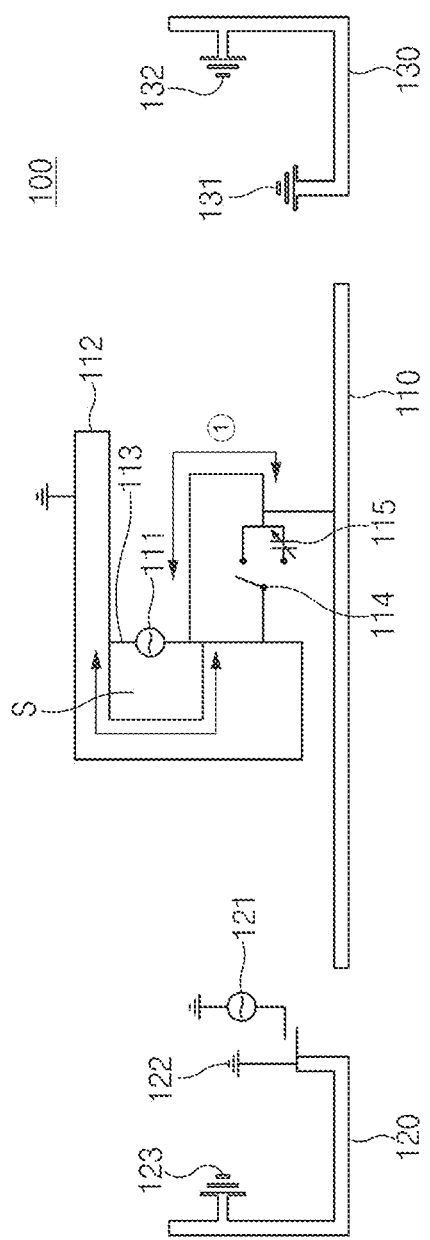
FIG. 1 illustrates an antenna included in an electronic device, according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

An electronic device according to various embodiments of the present disclosure may include at least one or more antennas. The antennas may be provided to communicate with the outside, and the shape, length, grounding position, feeding position, or the like of the antenna may be designed such that the antenna performs communication in a desired frequency band.

In this specification, the term "about" means that a value includes values in the range of ±5%.

Figure 2:
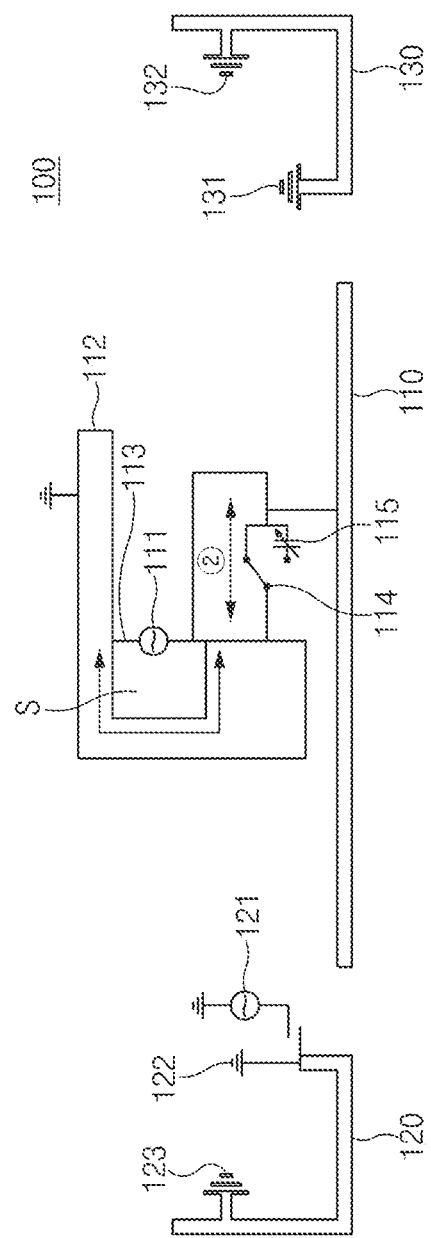
FIG. 2 illustrates an antenna included in an electronic device, according to an embodiment.
Figure 3:
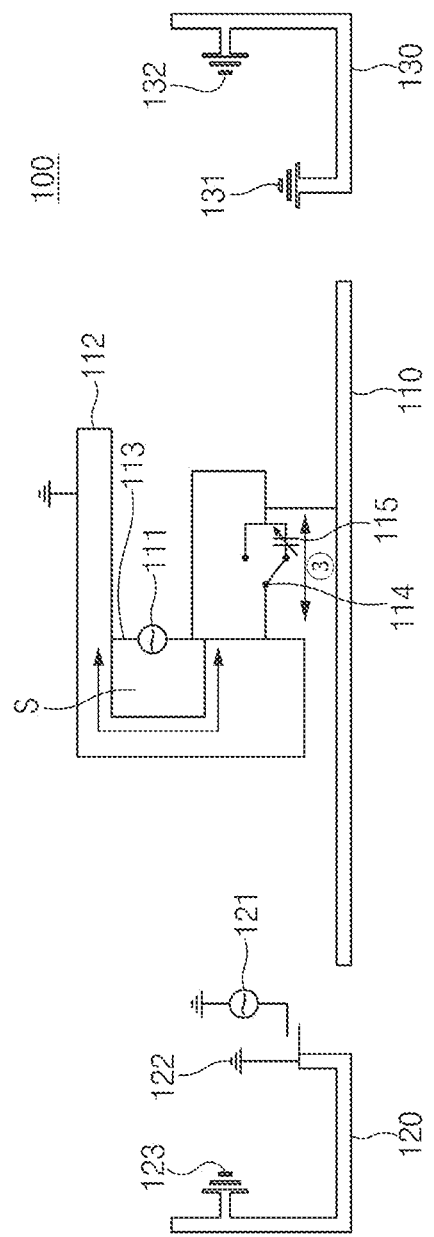
FIG. 3 illustrates an antenna included in an electronic device, according to an embodiment.

FIGS. 1 to 3 illustrate an antenna included in an electronic device, according to an embodiment.

Referring to FIGS. 1 to 3, an electronic device 100 may include a first metal housing 110, a second metal housing 120, and a third metal housing 130 that are displaced in the lower end. The first metal housing 110, the second metal housing 120, and the third metal housing 130 may be spaced apart from each other.

The first metal housing 110 may be connected to a first feeding part 111 and a first ground part 112 through a first path ① (refer to FIG. 1), a second path ② (refer to FIG. 2) and/or a third path ③ (refer to FIG. 3). The first metal housing 110 may be used as the radiator of an antenna. For example, the first metal housing 110 and the first feeding part 111 connected to the first metal housing 110 may operate as an antenna (hereinafter referred to as a "first antenna"). The first antenna may transmit or receive the signal of a first band through the first metal housing 110. For example, the signal of the first band may be a low-band signal of about 700 MHz to about 900 MHz.

The first ground part 112 may be electrically connected to the first feeding part 111 through a transmission line 113. The first ground part 112 may be electrically connected to the first metal housing 110 through the first path ①, the second path ②, and/or the third path ③. The first ground part 112 may include a patch-type conductor. For example, the first ground part 112 may be formed in a J-shape.

The first ground part 112 and the first feeding part 111 connected to the first ground part 112 may operate as an antenna (hereinafter, referred to as a "second antenna"). In this case, the first ground part 112 may be used as the radiator of the second antenna. A slit 's' may be formed by the first ground part 112 and the transmission line 113. The first ground part 112 may transmit or receive a signal of a second band through the slit 's'. For example, the signal of the second band may be a mid-band signal of about 1700 MHz to about 2200 MHz.

The first feeding part 111 may supply a signal. For example, the first feeding part 111 may supply a low-band signal or a mid-band signal. The first feeding part 111 may be electrically connected to the first ground part 112 or the first metal housing 110 through the transmission line 113. An embodiment is exemplified in FIG. 1 as the first feeding part 111 is connected to the first ground part 112 through the transmission line 113 from the outside of the first ground part 112. However, embodiments of the present disclosure may not be limited thereto. For example, the first feeding part 111 may be embedded in the first ground part 112. The signal supplied through the first feeding part 111 may be transmitted to the first ground part 112 or the first metal housing 110 through the transmission line 113. Most of the low-band signal supplied from the first feeding part 111 may be radiated through the first metal housing 110. Most of the mid-band signal supplied from the first feeding part 111 may be radiated through the first ground part 112. An antenna according to an embodiment of the present disclosure may be a multi-band antenna capable of transmitting and receiving the low-band signal and the mid-band signal.

A switch 114 may be interposed between the first feeding part 111 and the first metal housing 110. For example, the switch 114 may be disposed in the second path ② and the third path ③ that electrically connect the first feeding part 111 to the first metal housing 110 through different paths. The switch 114 may change the connection states of the second path ② and the third path ③. For example, as illustrated in FIG. 1, the switch 114 may open both the second path ② and the third path ③. In this case, the first feeding part 111 may not transmit a signal to the first metal housing 110 through the second path ② and the third path ③. For example, the switch 114 may be implemented with one or more complementary metal-oxide semiconductors (CMOSs). The operation of controlling the switch 114 will be described with reference to FIG. 11.

If the second path ② and the third path ③ are opened, the signal supplied through the first feeding part 111 may be transmitted to the first metal housing 110 through the first path ① that electrically connects the first feeding part 111 to the first metal housing 110.

The first path ① may be used as the radiator of the first antenna together with the first metal housing 110. The length of the first path ① may be determined in consideration of the resonance frequency of the first antenna. For example, if the first feeding part 111 and the first metal housing 110 are connected to each other through the first path ①, the first antenna may transmit or receive a signal of about 700 MHz band (B17) through the first path ① and the first metal housing 110.

The second metal housing 120 may be electrically connected to a second feeding part 121, a second ground part 122, and a third ground part 123. The second metal housing 120 may be used as the radiator of an antenna. The second metal housing 120 may transmit or receive a signal of a frequency band different from that of a signal that the first metal housing 110 transmits and receives. For example, since the length of the second metal housing 120 is shorter than that of the first metal housing 110, the second metal housing 120 may transmit or receive a signal of a band higher than that of the first metal housing 110.

The third metal housing 130 may be electrically connected to a fourth ground part 131 and a fifth ground part 132. The third metal housing 130 may be used as the radiator of an antenna. The third metal housing 130 may transmit or receive a signal of a frequency band different from that of a signal that the first metal housing 110 transmits and receives. For example, since the length of the third metal housing 130 is shorter than that of the first metal housing 110, the third metal housing 130 may transmit or receive a signal of a band higher than that of the first metal housing 110.

Although not illustrated in FIG. 1, the electronic device 100 may include nonconductive structures that do not directly affect antenna properties. For example, the nonconductive structure may be a structure for coupling the front case and the rear case of the electronic device 100.

Referring to FIG. 2, the switch 114 may electrically connect the first feeding part 111 and the second path ②. In this case, the signal supplied through the first feeding part 111 may be transmitted to the first metal housing 110 through the first path ① and the second path ②. Below, the operation of controlling the switch 114 will be described with reference to FIG. 11.

The second path ② may be used as the radiator of the first antenna together with the first metal housing 110. The physical/electrical length of the second path ② may be shorter than the physical/electrical length of the first path ①. In this case, the second path ② may dominantly affect the resonance frequency of the first antenna compared with the first path ①. The length of the second path ② may be determined in consideration of the resonance frequency of the first antenna. For example, if the first feeding part 111 and the first metal housing 110 are connected to each other through the first path ① and the second path ②, the first antenna may transmit or receive a signal of about 850 MHz band (B5).

Referring to FIG. 3, the switch 114 may electrically connect the first feeding part 111 and the third path ③. In this case, the signal supplied through the first feeding part 111 may be transmitted to the first metal housing 110 through the first path ① and the third path ③. Below, the operation of controlling the switch 114 will be described with reference to FIG. 11.

The third path ③ may be used as the radiator of the first antenna together with the first metal housing 110. The physical/electrical length of the third path ③ may be shorter than the physical/electrical length of the first path ①. Moreover, the electrical length of the third path ③ may be shorter than the electrical length of the second path ②. In this case, the third path ③ may dominantly affect the resonance frequency of the first antenna compared with the first path ①. The length of the third path ③ may be determined in consideration of the resonance frequency of the first antenna. For example, if the first feeding part 111 and the first metal housing 110 are connected to each other through the first path ① and the third path ③, the first antenna may transmit or receive a signal of a band (e.g., 900 MHz band (B8)) higher than the 850 MHz band (B5) depending on the electrical length of the third path ③.

The third path ③ may include a variable capacitor 115. The capacitance of the variable capacitor 115 may be changed. The capacitance of the variable capacitor 115 may be changed depending on the required resonance frequency of the first antenna or the required communication state of the electronic device 100. For example, the capacitance of the variable capacitor 115 may be about 6 pF to about 18 pF. Below, the operation of controlling the variable capacitor 115 will be described with reference to FIG. 11.

The electrical length of the third path ③ may be changed depending on the capacitance of the variable capacitor 115. For example, if the capacitance of the variable capacitor 115 increases, the electrical length of the third path ③ may increase. As such, the resonance frequency of the first antenna may decrease. For another example, if the capacitance of the variable capacitor 115 decreases, the electrical length of the third path ③ may decrease. As such, the resonance frequency of the first antenna may increase. If the first feeding part 111 and the first metal housing 110 are connected to each other through the third path ③, the resonance frequency of the first antenna may be greater than 850 MHz described with reference to FIG. 2. For example, the resonance frequency of the first antenna may be changed to about 900 MHz (B8) depending on the capacitance of the variable capacitor 115.

As described above with reference to FIGS. 1 to 3, the signal supplied through the first feeding part 111 may be transmitted to the first metal housing 110 through the first path ①, the second path ②, and/or the third path ③ that electrically connects the first feeding part 111 to the first metal housing 110. In this case, a path, which is electrically connected to the first feeding part 111 and the first metal housing 110, from among the first path ①, the second path ②, and the third path ③ may be used as the radiator of the first antenna together with the first metal housing 110.

The electrical lengths or the physical lengths of the first path ①, the second path ②, and the third path ③, through which each signal passes, may be different from each other. The electrical lengths or the physical lengths of the first path ①, the second path ②, and the third path ③ may be determined in consideration of the resonance frequency of the antenna.

That is, the length of the radiator that determines the resonance frequency of the antenna may be variously changed by controlling the switch 114 and the capacitance of the variable capacitor 115. Accordingly, the electronic device 100 may perform communication in various frequency bands by using the antenna having the above-described structure.

Figure 4:
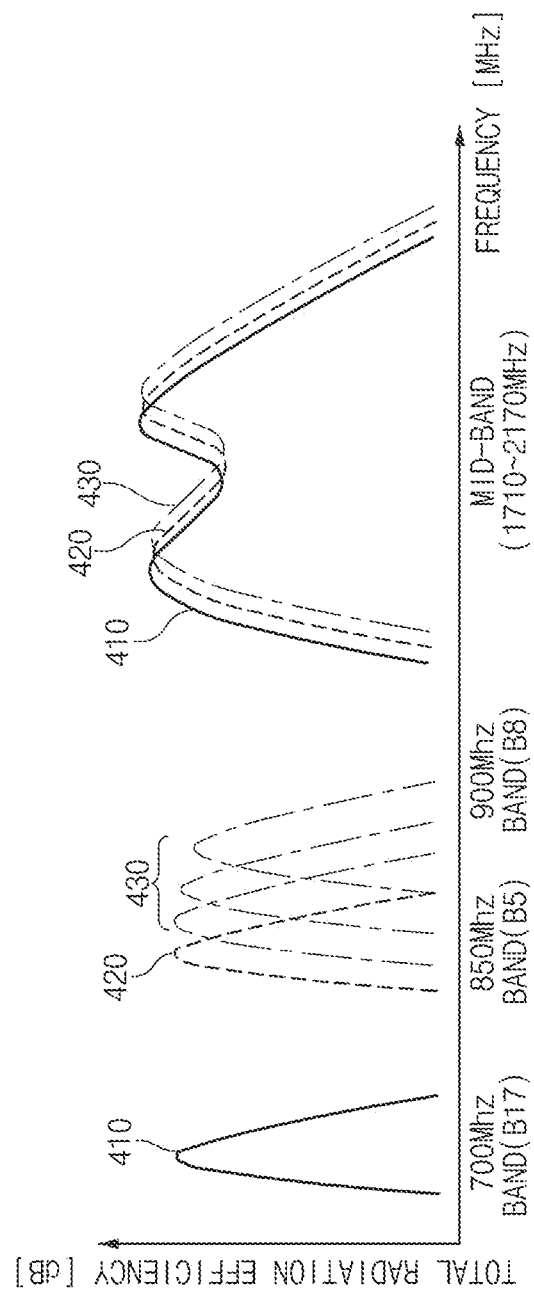
FIG. 4 illustrates efficiency according to a frequency of an antenna included in an electronic device, according to an embodiment of the present disclosure.

FIG. 4 illustrates efficiency according to a frequency of an antenna included in an electronic device, according to an embodiment of the present disclosure.

Referring to FIG. 4, a first graph 410 illustrates the efficiency of an antenna according to the case (hereinafter called a "first embodiment") where the first feeding part 111 and the first metal housing 110 are connected to each other through the first path ①. A second graph 420 illustrates the efficiency of an antenna according to the case (hereinafter called a "second embodiment") where the first feeding part 111 and the first metal housing 110 are connected to each other through the first path ① and the second path ②. A third graph 430 illustrates the efficiency of an antenna according to the case (hereinafter called a "third embodiment") where the first feeding part 111 and the first metal housing 110 are connected to each other through the first path ① and the third path ③.

Firstly, referring to a low-band (e.g., a section of 1000 MHz or less), the resonance frequency of the antenna according to the first embodiment may be 700 MHz, and the antenna may support B17. The resonance frequency of the antenna according to the second embodiment may be 850 MHz and, and the antenna may support B5. Since the resonance is changed depending on the capacitance of the variable capacitor, the antenna according to the third embodiment may have various resonance frequencies of 850 MHz to 900 MHz. Accordingly, the antenna according to third embodiment may support various bands and may supports, for example, B8. As described above, the antenna according to various embodiments of the present disclosure may support communication of various bands (e.g., B17, B5, or B8) in low frequency band.

Next, referring to a mid-band (e.g., 1710 MHz to 2170 MHz), the antenna according to the first embodiment, the antenna according to the second embodiment, and the antenna according to the third embodiment may have the characteristics of the total radiation efficiency similar to each other. That is, even though the characteristic of the antenna in the low-band is changed, the characteristic of the antenna in the mid-band may not be changed. As described above, the antenna according to various embodiments of the present disclosure may improve the performance in the low-band without performance deterioration in the mid-band. Accordingly, the performance of the antenna may be secured for carrier aggregation.

FIGS. 5 to 8 illustrate an antenna included in an electronic device, according to another embodiment. For convenience of description, a description given with reference to FIGS. 1 to 3 will not be repeated here.

Figure 5:
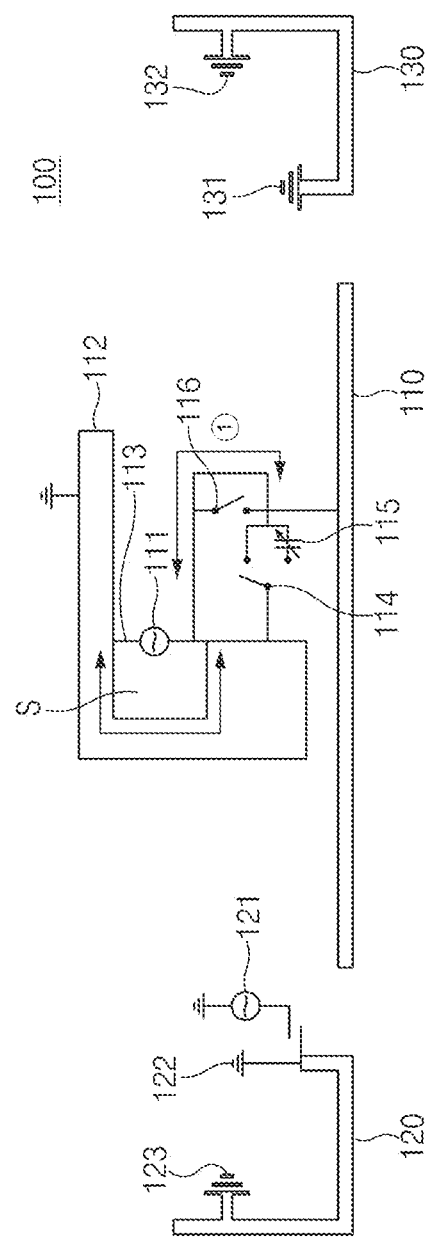
FIG. 5 illustrates an antenna included in an electronic device, according to another embodiment.

Referring to FIG. 5, the electronic device 100 according to another embodiment of the present disclosure may include the first switch 114 (the switch 114 of FIGS. 1 to 3) and a second switch 116. The first switch 114 may be interposed between the first feeding part 111 and the first metal housing 110. For example, the first switch 114 may be disposed in the second path ② and the third path ③ that electrically connect the first feeding part 111 to the first metal housing 110. The first switch 114 may change the connection states of the second path ② and the third path ③. For example, as illustrated in FIG. 5, the first switch 114 may open both the second path ② and the third path ③. In this case, the second path ② and the third path ③ fail to transmit a signal from the first feeding part 111 to the first metal housing 110.

The second switch 116 may be interposed between the first feeding part 111 and the first metal housing 110. The second switch 116 may be interposed between one point of the first path ① and the first metal housing 110. The second switch 116 may electrically connect or disconnect the one point of the first path ① to or from the first metal housing 110. For example, the second switch 116 may be disposed in the fourth path ④ that electrically connects the first feeding part 111 to the first metal housing 110. The second switch 116 may change the connection state of the fourth path ④. For example, as illustrated in FIG. 5, the second switch 116 may open the fourth path ④. In this case, the fourth path ④ fails to transmit a signal from the first feeding part 111 to the first metal housing 110. For example, the second switch 116 may be implemented with one or more CMOSs. Below, the operation of controlling the first switch 114 and the second switch 116 will be described with reference to FIG. 11.

As described above, if the first switch 114 and the second switch 116 are opened, the signal supplied through the first feeding part 111 may be transmitted to the first metal housing 110 through the first path ①.

The first path ① may be used as the radiator of the first antenna together with the first metal housing 110. For example, if the first feeding part 111 and the first metal housing 110 are connected to each other through the first path ①, the first antenna may transmit or receive a signal of about 700 MHz band (B17) through the first path ① and the first metal housing 110.

Figure 6:
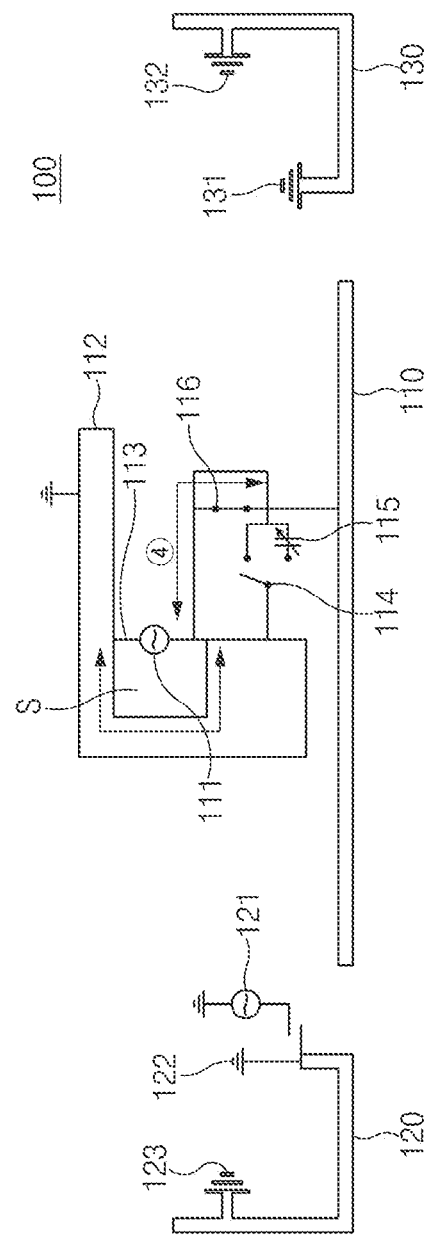
FIG. 6 illustrates an antenna included in an electronic device, according to another embodiment.

Referring to FIG. 6, the second switch 116 may electrically connect the first feeding part 111 and the fourth path ④. In this case, the signal supplied through the first feeding part 111 may be transmitted to the first metal housing 110 through the first path ① and the fourth path ④. In this case, the first switch 114 may open the second path ② and the third path ③. Below, the operation of controlling the first switch 114 and the second switch 116 will be described with reference to FIG. 11.

The fourth path ④ may be used as the radiator of the first antenna together with the first metal housing 110. The physical/electrical length of the fourth path ④ may be shorter than the physical/electrical length of the first path ①. In this case, the fourth path ④ may dominantly affect the resonance frequency of the first antenna compared with the first path ①. The length of the fourth path ④ may be determined in consideration of the resonance frequency of the first antenna. For example, if the first feeding part 111 and the first metal housing 110 are connected to each other through the first path ① and the fourth path ④, the first antenna may transmit or receive a signal of about 800 MHz band (B20).

Figure 7:
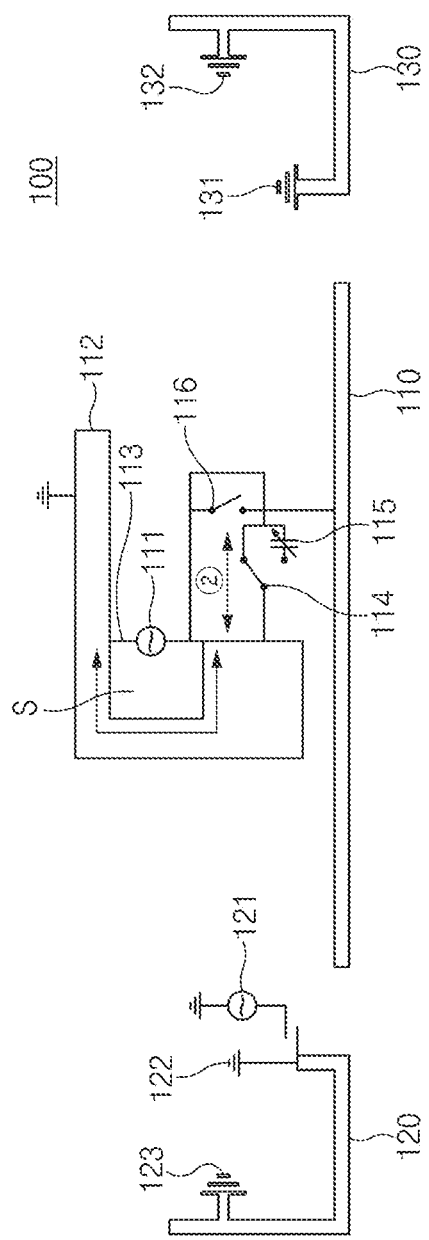
FIG. 7 illustrates an antenna included in an electronic device, according to another embodiment.

Referring to FIG. 7, the first switch 114 may electrically connect the first feeding part 111 and the second path ②. In this case, the signal supplied through the first feeding part 111 may be transmitted to the first metal housing 110 through the first path ① and the second path ②. In this case, the second switch 116 may open the fourth path ④. Below, the operation of controlling the first switch 114 and the second switch 116 will be described with reference to FIG. 11.

The second path ② may be used as the radiator of the first antenna together with the first metal housing 110. The physical/electrical length of the second path ② may be shorter than each of the physical/electrical lengths of the first path ① and the fourth path ④. For example, if the first feeding part 111 and the first metal housing 110 are connected to each other through the first path ① and the second path ②, the first antenna may transmit or receive a signal of about 800 MHz band (B20).

Figure 8:
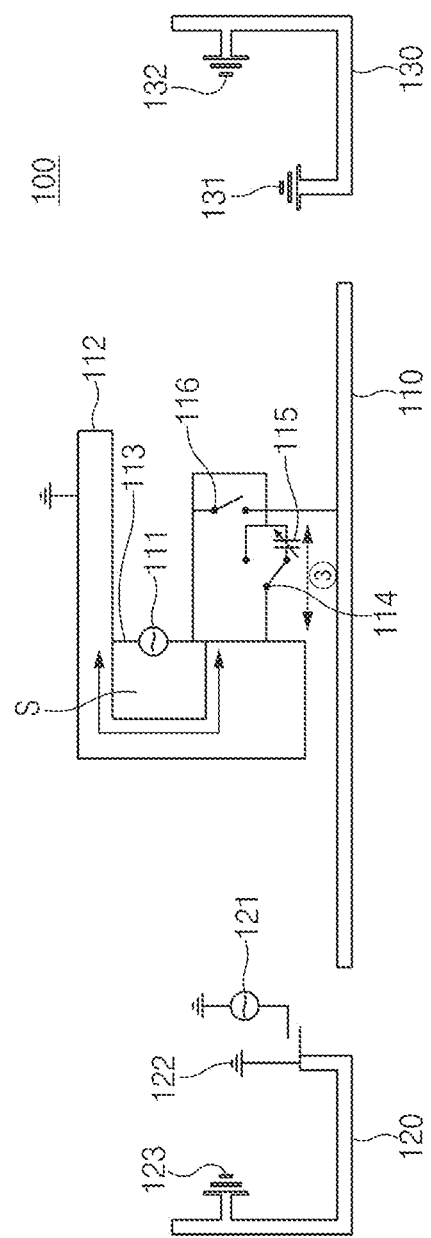
FIG. 8 illustrates an antenna included in an electronic device, according to another embodiment.

Referring to FIG. 8, the first switch 114 may electrically connect the first feeding part 111 and the third path ③. In this case, the signal supplied through the first feeding part 111 may be transmitted to the first metal housing 110 through the first path ① and the third path ③. In this case, the second switch 116 may open the fourth path ④. Below, the operation of controlling the first switch 114 and the second switch 116 will be described with reference to FIG. 11.

The third path ③ may be used as the radiator of the first antenna together with the first metal housing 110. The physical/electrical length of the third path ③ may be shorter than the physical/electrical length of the first path ①. Moreover, the electrical length of the third path ③ may be shorter than the electrical length of the second path ②. For example, if the first feeding part 111 and the first metal housing 110 are connected to each other through the first path ① and the third path ③, the first antenna may transmit or receive a signal of a band (e.g., 900 MHz band (B8)) higher than the 850 MHz band (B5) depending on the electrical length of the third path ③.

As described above with reference to FIGS. 5 to 8, if the second switch 116 is closed, the signal supplied through the first feeding part 111 may be transmitted to the first metal housing 110 through the fourth path ④. In this case, the fourth path ④ may be used as the radiator of the first antenna together with the first metal housing 110.

The electrical lengths or the physical lengths of the first path ①, the second path ②, the third path ③, and the fourth path ④ including the second switch 116, through each of which a signal passes, may be different from each other. The electrical lengths or the physical lengths of the first path ①, the second path ②, the third path 3 , and the fourth path ④ may be determined in consideration of the resonance frequency of an antenna.

That is, the communication of various frequency bands may be performed by using the fourth path ④ including the second switch 116.

Figure 9:
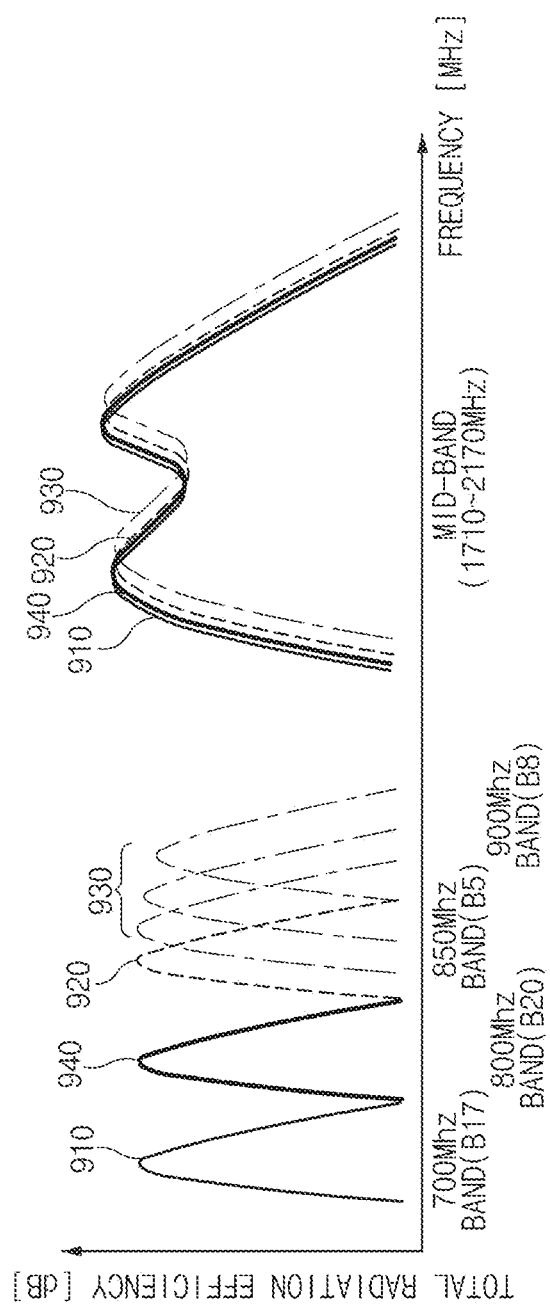
FIG. 9 illustrates efficiency according to a frequency of an antenna included in an electronic device, according to another embodiment of the present disclosure.

FIG. 9 illustrates efficiency according to a frequency of an antenna included in an electronic device, according to another embodiment of the present disclosure.

Referring to FIG. 9, a first graph 910 illustrates the efficiency of an antenna according to the case (hereinafter called a "first embodiment") where a first feeding part and a first metal housing are connected to each other through the first path. A second graph 920 illustrates the efficiency of an antenna according to the case (hereinafter called a "second embodiment") where the first feeding part and the first metal housing are connected to each other through the first path and a second path. A third graph 930 illustrates the efficiency of an antenna according to the case (hereinafter called a "third embodiment") where the first feeding part and the first metal housing are connected to each other through the first path and a third path. A fourth graph 940 illustrates the efficiency of an antenna according to the case (hereinafter called a "fourth embodiment") where the first feeding part and the first metal housing are connected to each other through the first path and a fourth path. The first graph 910, the second graph 920, and the third graph 930 may be similar to the first graph 410, the second graph 420, and the third graph 430 of FIG. 4, respectively.

Firstly, referring to a low-band (e.g., a section of 1000 MHz or less), the resonance frequency of the antenna according to the first embodiment may be 700 MHz, and the antenna may support B17. The resonance frequency of the antenna according to the second embodiment may be 850 MHz and, the antenna may support B5. The antenna according to the third embodiment may have various resonance frequencies (e.g., 900 MHz) of 850 MHz or more depending on the capacitance of the variable capacitor and may support, for example, B8. The resonance frequency of the antenna according to the fourth embodiment may be 800 MHz, and the antenna may support B20. As described above, the antenna according to various embodiments of the present disclosure may support communication of various bands (e.g., B17, B20, B5, or B8), by using two switches.

Next, referring to a mid-band (e.g., 1710 MHz to 2170 MHz), the antenna according to the first embodiment, the antenna according to the second embodiment, the antenna according to the third embodiment, and the antenna according to the fourth embodiment may have the characteristics of the total radiation efficiency similar to each other. That is, even though the characteristic of the antenna in the low-band is changed, the characteristic of the antenna in the mid-band may not be changed. As described above, even though using an additional switch (e.g., a second switch), the antenna according to various embodiments of the present disclosure may improve the performance in the low-band without performance deterioration in the mid-band.

Figure 10:
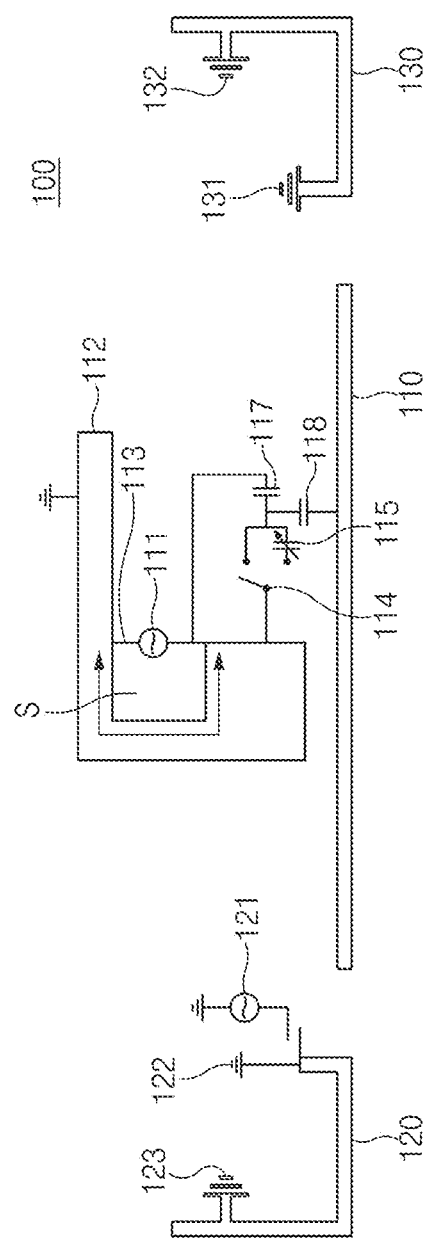
FIG. 10 illustrates an antenna included in an electronic device, according to another embodiment.

FIG. 10 illustrates an antenna included in an electronic device, according to another embodiment.

Referring to FIG. 10, an antenna of the electronic device 100 according to another embodiment of the present disclosure may further include a first capacitor 117 and a second capacitor 118. The first capacitor 117 may be disposed in the first path ①. The second capacitor 118 may be disposed in a path adjacent to the first metal housing.

According to various embodiments, the electronic device 100 may include a receptacle (e.g., USB port) capable of being electrically connected to a cable of an external device, or the like. The receptacle may be formed to pass through the first metal housing. For example, the electronic device 100 may receive direct current (DC) power through the receptacle for battery charging. In this case, the DC power supplied through the receptacle may be leaked. The leakage current may be transmitted to the first metal housing and may be transmitted to the first metal housing through the first path ①, the second path ②, or the like. The leakage current may cause the malfunction of the antenna or the damage to the antenna, and may be transmitted to a user's skin contacting the first metal housing. As illustrated in FIG. 10, it is possible to prevent the leakage of the DC power, by disposing the first capacitor 117 and the second capacitor 118.

Figure 11:
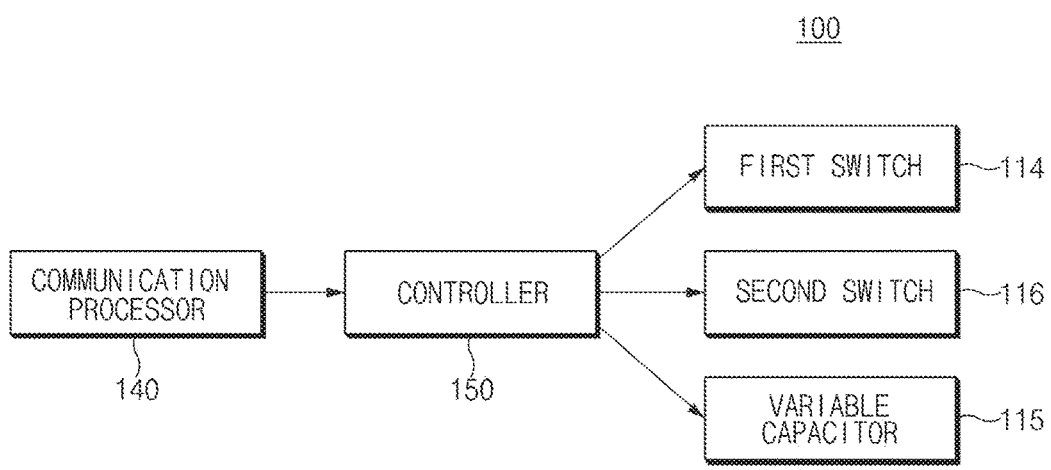
FIG. 11 is a block diagram illustrating a configuration of an electronic device according to an embodiment.

FIG. 11 is a block diagram illustrating a configuration of an electronic device according to an embodiment.

Referring to FIG. 11, an electronic device may include a communication processor (CP) 140, a controller 150, the first switch 114, the second switch 116, and the variable capacitor 115.

The communication processor 140 may be electrically connected to the controller 150. The communication processor 140 may transmit a control signal to the controller 150 to control the first switch 114, the second switch 116, and the variable capacitor 115. For example, the communication processor 140 may transmit the control signal to the controller 150 in consideration of the communication state of the electronic device 100. For another example, the communication processor 140 may control the first switch 114, the second switch 116, and the variable capacitor 115 based on the communication scheme selected by a user, and may select a frequency band suitable for the selected communication scheme.

According to an embodiment, if a dielectric contacts a radiator, the communication processor 140 may change the capacitance of the variable capacitor 115 using the controller 150. If an object with high dielectric permittivity and loss contacts the radiator or an area between radiators adjacent to each other, the resonance frequency of the antenna may be changed. The object with the high dielectric permittivity and the loss may be a user's hands. As described above, the phenomenon that the resonance frequency of an antenna is changed due to the contact of the object is called a "death grip phenomenon". The change of the antenna resonance frequency due to the death grip may not be intended, may cause the communication yield to decrease, and may cause inconvenience to the user. Accordingly, for the purpose of reducing the change in the resonance frequency due to the death grip, the electronic device 100 may change the capacitance of the variable capacitor 115 to adjust the resonance frequency. For the purpose of compensating the resonance frequency shifted by the death grip, the communication processor 140 may transmit, to the controller 150, a control signal for changing the capacitance of the variable capacitor 115.

According to an embodiment, the communication processor 140 may determine whether the dielectric contacts a radiator, based on the communication state of the electronic device 100. For example, the communication processor 140 may sense the efficiency change of an antenna according to the frequency to determine whether the dielectric contacts the radiator. If it is determined that the dielectric contacts the radiator, the communication processor 140 may transmit, to the controller 150, the control signal for changing the capacitance of a capacitor.

According to an embodiment, the electronic device 100 may further include a sensor circuit that determines whether the dielectric contacts the radiator. The sensor circuit may include at least one of an image sensor, an infrared sensor, or a proximity sensor. The electronic device 100 may recognize the contact of the dielectric by using an image sensor, an infrared sensor, or a proximity sensor. If it is determined that the dielectric contacts the radiator, the communication processor 140 may transmit, to the controller 150, the control signal for changing the capacitance of a capacitor.

According to an embodiment, the communication processor 140 may transmit, to the controller 150, a control signal for controlling the on/off states of the first switch 114 and the second switch 116. For example, the communication processor 140 may transmit the control signal to the controller 150 for the purpose of changing the resonance frequency in a low-band.

The controller 150 may receive the control signal from the communication processor 140. The controller 150 may control the first switch 114, the second switch 116, and the variable capacitor 115 based on the control signal. For example, the controller 150 may control the first switch 114 such that a second path or a third path is activated or deactivated. For another example, the controller 150 may control the second switch 116 such that a fourth path is activated or deactivated. For another example, the controller 150 may control the capacitance of the variable capacitor 115 such that the electronic length of a third path is changed. An antenna may have different frequency characteristics depending on the control of the controller 150.

An embodiment of the inventive concept is exemplified in FIG. 11 as the electronic device 100 includes the one controller 150 to control the first switch 114, the second switch 116, and the variable capacitor 115. However, embodiments of the present disclosure may not be limited thereto. For example, the electronic device 100 may include each of the controller 150 to control the first switch 114, the controller 150 to control the second switch 116, and the controller 150 to control the variable capacitor 115.

The first switch 114 and the second switch 116 may be controlled by the controller 150. For example, the on/off states of the first switch 114 and the second switch 116 may be controlled by the controller 150.

The variable capacitor 115 may be controlled by the controller 150. For example, the capacitance of the variable capacitor 115 may be controlled by the controller 150.

Figure 12:
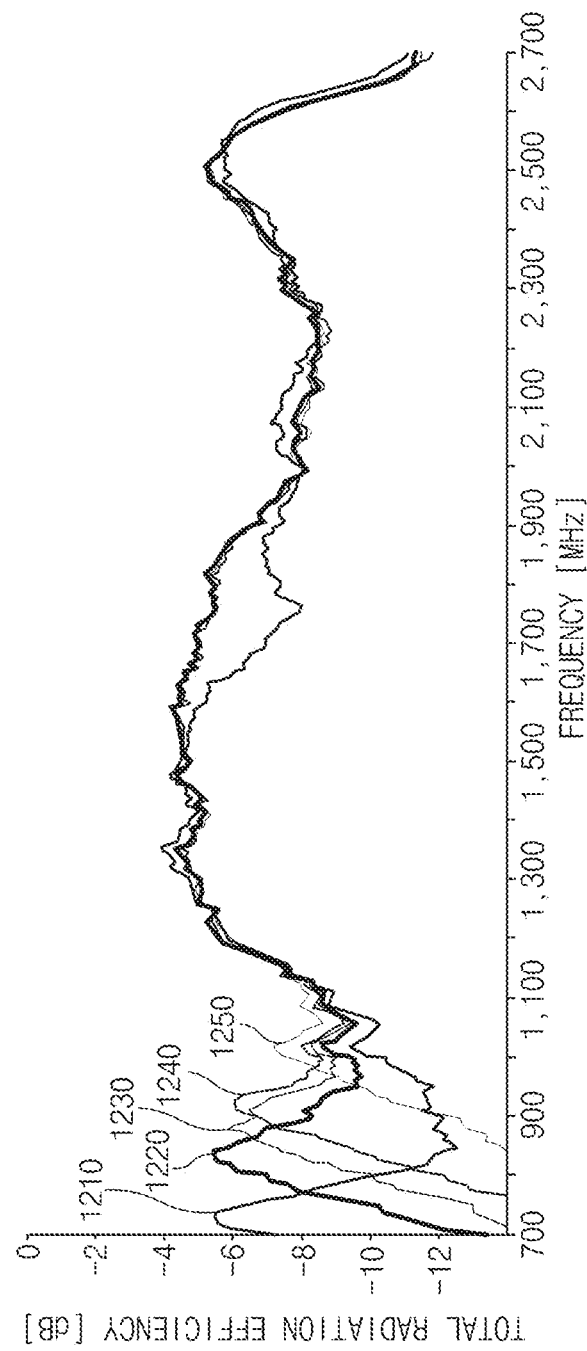
FIG. 12 is a graph illustrating an experiment result in which efficiency according to the frequency of an antenna in a low-band and a mid-band is measured, according to various embodiments.

FIG. 12 is a graph illustrating an experiment result in which efficiency according to the frequency of an antenna in a low-band and a mid-band is measured, according to various embodiments. The experiment has been performed by the electronic device 100 illustrated in FIGS. 1 to 3.

Referring to FIG. 12, if a switch is opened, a first graph 1210 illustrates the total radiation efficiency of an antenna according to a frequency. If the switch is connected to a second path, a second graph 1220 illustrates the total radiation efficiency of the antenna according to a frequency. If the switch is connected to a third path and the capacitance of a variable capacitor is 18 pF, a third graph 1230 illustrates the total radiation efficiency of the antenna according to a frequency. If the switch is connected to the third path and the capacitance of a variable capacitor is 12 pF, a fourth graph 1240 illustrates the total radiation efficiency of the antenna according to a frequency. If the switch is connected to the third path and the capacitance of a variable capacitor is 16 pF, a fifth graph 1250 illustrates the total radiation efficiency of the antenna according to a frequency.

First of all, referring to a low-band (e.g., a section of 1000 MHz or less), the characteristics of the antennas illustrated in the first graph 1210 to the fifth graph 1250 are different from each other.

In the meantime, referring to a mid-band (e.g., 1710 MHz to 2170 MHz), the total radiation efficiency according to the frequencies illustrated in the second graph 1220, the third graph 1230, the fourth graph 1240, and the fifth graph 1250 other than the first graph 1210 may be similar to each other.

That is, even though the characteristic of the antenna in the low-band is changed, it is verified, through an experiment, that the characteristic of the antenna in the mid-band is not changed.

Figure 13:
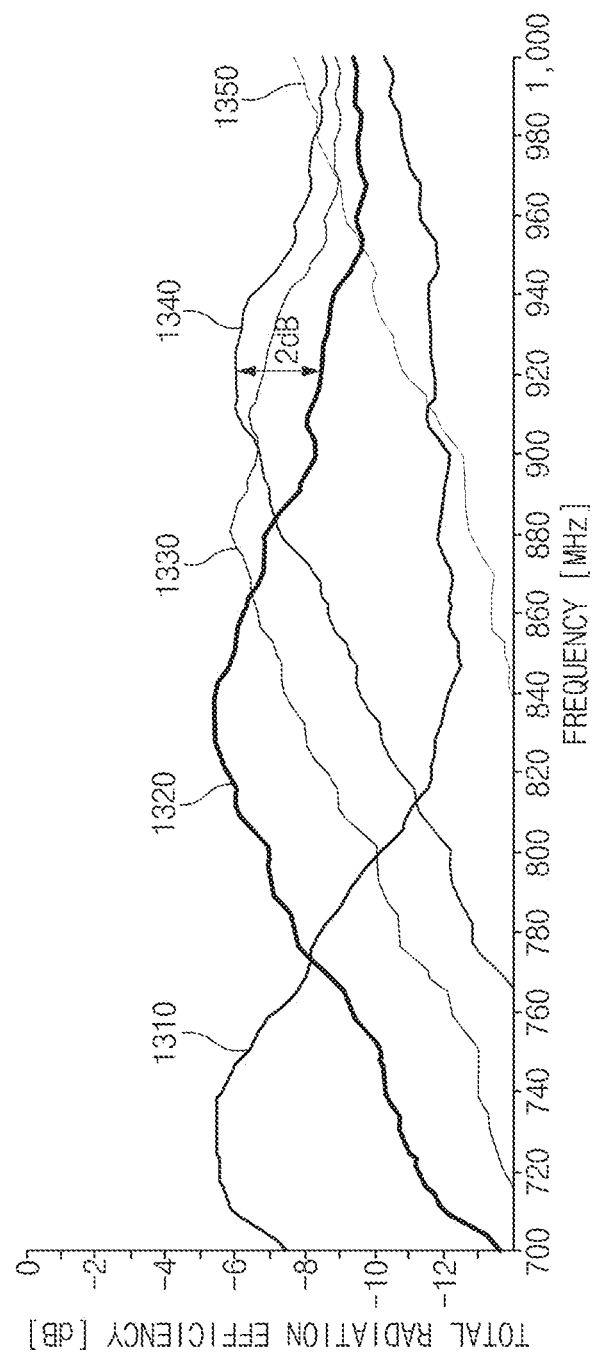
FIG. 13 is a graph illustrating an experiment result in which efficiency according to the frequency of an antenna in a low-band is measured, according to various embodiments.

FIG. 13 is a graph illustrating an experiment result in which efficiency according to the frequency of an antenna in a low-band is measured, according to various embodiments.

Referring to FIG. 13, a first graph 1310, a second graph 1320, a third graph 1330, a fourth graph 1340, and a fifth graph 1350 are the first graph 1210, the second graph 1220, the third graph 1230, the fourth graph 1240, and the fifth graph 1250, which are in a section of a low-band (700 MHz to 1000 MHz), in FIG. 12, respectively.

The resonance frequency of the second graph 1220 is greater than the resonance frequency of the first graph 1210. The resonance frequency of the third graph 1230 is greater than the resonance frequency of the second graph 1220. The resonance frequency of the fourth graph 1240 is greater than the resonance frequency of the third graph 1230. The resonance frequency of the fifth graph 1250 is greater than the resonance frequency of the fourth graph 1240.

That is, the magnitude of the resonance frequency may increase by activating a second path. In addition, the magnitude of the resonance frequency may increase by activating a third path, compared with the case where the second path is activated. Furthermore, the magnitude of the resonance frequency may increase by activating the third path and decreasing the capacitance of a variable capacitor. In particular, it may be verified that the total radiation efficiency of an antenna at 920 MHz is improved by 2 dB or more, by using the variable capacitor.

Figure 14:
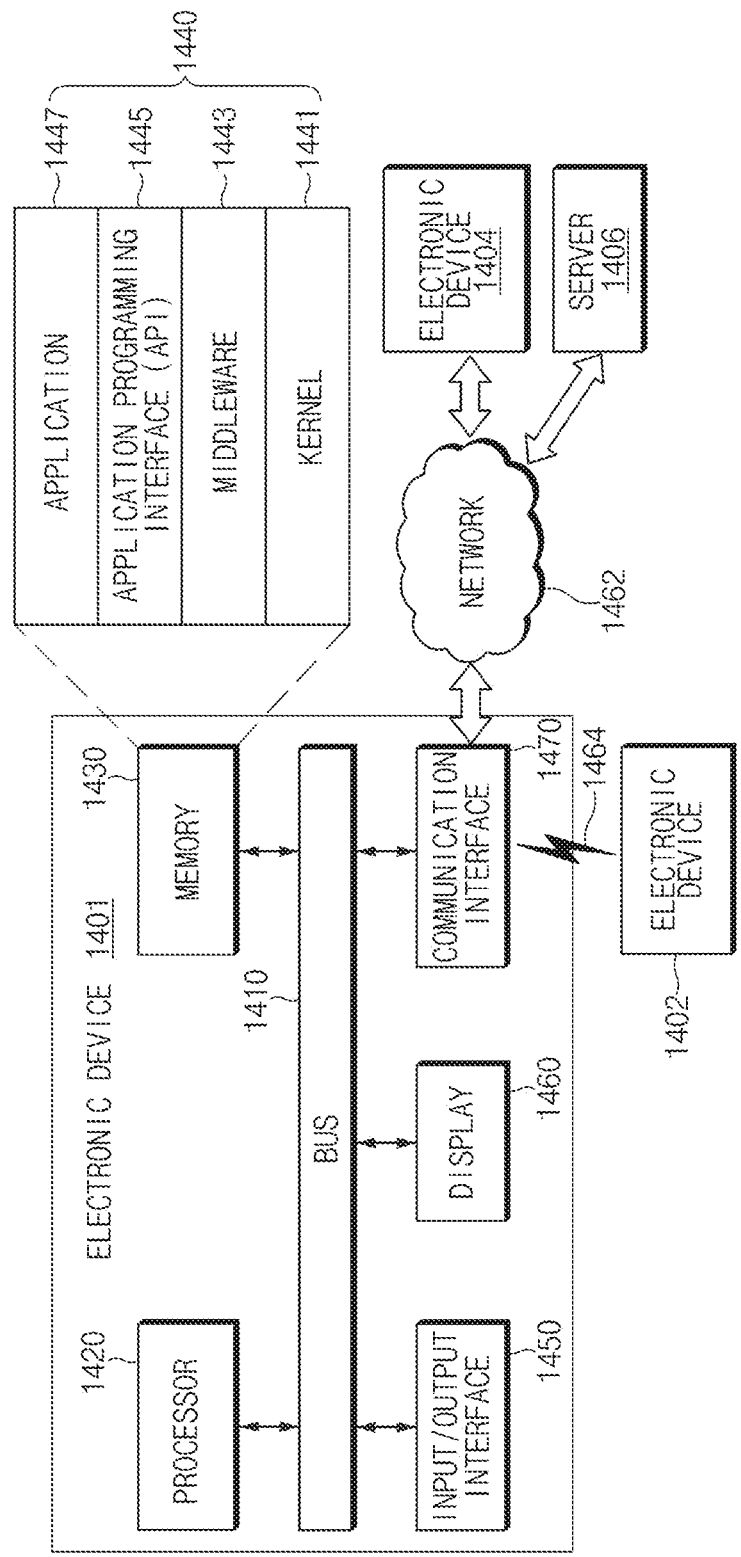
FIG. 14 illustrates the electronic device in a network environment according to various embodiments.

FIG. 14 illustrates an electronic device in a network environment system, according to various embodiments.

Referring to FIG. 14, according to various embodiments, an electronic device 1401, 1402, or 1404, or a server 1406 may be connected each other over a network 1462 or a short range communication 1464. The electronic device 1401 may include a bus 1410, a processor 1420, a memory 1430, an input/output interface 1450, a display 1460, and a communication interface 1470. According to an embodiment, the electronic device 1401 may not include at least one of the above-described elements or may further include other element(s).

For example, the bus 1410 may interconnect the above-described elements 1410 to 1470 and may include a circuit for conveying communications (e.g., a control message and/or data) among the above-described elements.

The processor 1420 may include one or more of a central processing unit (CPU), an application processor (AP), or a communication processor (CP). For example, the processor 1420 may perform an arithmetic operation or data processing associated with control and/or communication of at least other elements of the electronic device 1401.

The memory 1430 may include a volatile and/or nonvolatile memory. For example, the memory 1430 may store instructions or data associated with at least one other element(s) of the electronic device 1401. According to an embodiment, the memory 1430 may store software and/or a program 1440. The program 1440 may include, for example, a kernel 1441, a middleware 1443, an application programming interface (API) 1445, and/or an application program (or "an application") 1447. At least a part of the kernel 1441, the middleware 1443, or the API 1445 may be referred to as an "operating system (OS)".

For example, the kernel 1441 may control or manage system resources (e.g., the bus 1410, the processor 1420, the memory 1430, and the like) that are used to execute operations or functions of other programs (e.g., the middleware 1443, the API 1445, and the application program 1447). Furthermore, the kernel 1441 may provide an interface that allows the middleware 1443, the API 1445, or the application program 1447 to access discrete elements of the electronic device 1401 so as to control or manage system resources.

The middleware 1443 may perform, for example, a mediation role such that the API 1445 or the application program 1447 communicates with the kernel 1441 to exchange data.

Furthermore, the middleware 1443 may process task requests received from the application program 1447 according to a priority. For example, the middleware 1443 may assign the priority, which makes it possible to use a system resource (e.g., the bus 1410, the processor 1420, the memory 1430, or the like) of the electronic device 1401, to at least one of the application program 1447. For example, the middleware 1443 may process the one or more task requests according to the priority assigned to the at least one, which makes it possible to perform scheduling or load balancing on the one or more task requests.

The API 1445 may be, for example, an interface through which the application program 1447 controls a function provided by the kernel 1441 or the middleware 1443, and may include, for example, at least one interface or function (e.g., an instruction) for a file control, a window control, image processing, a character control, or the like.

The input/output interface 1450 may play a role, for example, of an interface which transmits an instruction or data input from a user or another external device, to other element(s) of the electronic device 1401. Furthermore, the input/output interface 1450 may output an instruction or data, received from other element(s) of the electronic device 1401, to a user or another external device.

The display 1460 may include, for example, a liquid crystal display (LCD), a light-emitting diode (LED) display, an organic LED (OLED) display, a microelectromechanical systems (MEMS) display, or an electronic paper display. The display 1460 may display, for example, various contents (e.g., a text, an image, a video, an icon, a symbol, and the like) to a user. The display 1460 may include a touch screen and may receive, for example, a touch, gesture, proximity, or hovering input using an electronic pen or a part of a user's body.

For example, the communication interface 1470 may establish communication between the electronic device 1401 and an external device (e.g., the first external electronic device 1402, the external second electronic device 1404, or the server 1406). For example, the communication interface 1470 may be connected to the network 1462 over wireless communication or wired communication to communicate with the external device (e.g., the second external electronic device 1404 or the server 1406).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 1464. The short range communication 1464 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1401 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1462 may include at least one of telecommunications networks, for example, a computer network (e.g., LAN or WAN), an Internet, or a telephone network.

Each of the first and second external electronic devices 1402 and 1404 may be a device of which the type is different from or the same as that of the electronic device 1401. According to an embodiment, the server 1406 may include a group of one or more servers. According to various embodiments, all or a portion of operations that the electronic device 1401 will perform may be executed by another or plural electronic devices (e.g., the electronic device 1402 or 1404 or the server 1406). According to an embodiment, if the electronic device 1401 executes any function or service automatically or in response to a request, the electronic device 1401 may not perform the function or the service internally, but, alternatively additionally, it may request at least a portion of a function associated with the electronic device 1401 from another device (e.g., the electronic device 1402 or 1404 or the server 1406). The other electronic device may execute the requested function or additional function and may transmit the execution result to the electronic device 1401. The electronic device 1401 (e.g., the electronic device 1402 or 1404 or the server 1406) may provide the requested function or service using the received result or may additionally process the received result to provide the requested function or service. To this end, for example, cloud computing, distributed computing, or client-server computing may be used.

Figure 15:
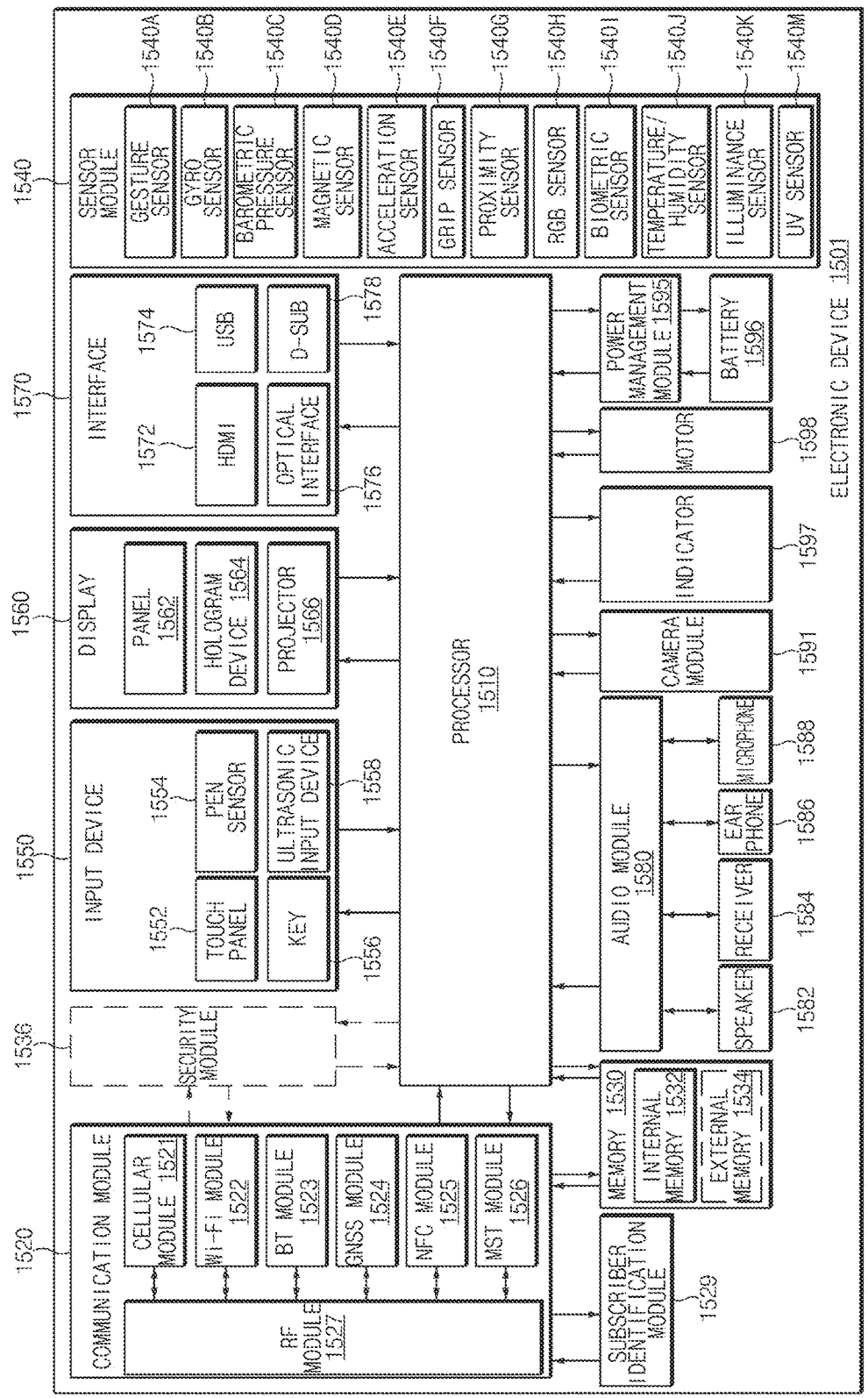
FIG. 15 illustrates a block diagram of the electronic device, according to various embodiments.

FIG. 15 illustrates a block diagram of an electronic device, according to various embodiments.

Referring to FIG. 15, an electronic device 1501 may include, for example, all or a part of the electronic device 1401 illustrated in FIG. 14. The electronic device 1501 may include one or more processors (e.g., an application processor (AP)) 1510, a communication module 1520, a subscriber identification module 1529, a memory 1530, a sensor module 1540, an input device 1550, a display 1560, an interface 1570, an audio module 1580, a camera module 1591, a power management module 1595, a battery 1596, an indicator 1597, and a motor 1598.

The processor 1510 may drive, for example, an operating system (OS) or an application to control a plurality of hardware or software elements connected to the processor 1510 and may process and compute a variety of data. For example, the processor 1510 may be implemented with a System on Chip (SoC). According to an embodiment, the processor 1510 may further include a graphic processing unit (GPU) and/or an image signal processor. The processor 1510 may include at least a part (e.g., a cellular module 1521) of elements illustrated in FIG. 15. The processor 1510 may load a command or data, which is received from at least one of other elements (e.g., a nonvolatile memory), into a volatile memory and process the loaded command or data. The processor 1510 may store a variety of data in the nonvolatile memory.

The communication module 1520 may be configured the same as or similar to the communication interface 1470 of FIG. 14. The communication module 1520 may include the cellular module 1521, a Wi-Fi module 1522, a Bluetooth (BT) module 1523, a GNSS module 1524 (e.g., a GPS module, a Glonass module, a Beidou module, or a Galileo module), a near field communication (NFC) module 1525, a MST module 1526 and a radio frequency (RF) module 1527.

The cellular module 1521 may provide, for example, voice communication, video communication, a character service, an Internet service, or the like over a communication network. According to an embodiment, the cellular module 1521 may perform discrimination and authentication of the electronic device 1501 within a communication network by using the subscriber identification module (e.g., a SIM card) 1529. According to an embodiment, the cellular module 1521 may perform at least a portion of functions that the processor 1510 provides. According to an embodiment, the cellular module 1521 may include a communication processor (CP).

Each of the Wi-Fi module 1522, the BT module 1523, the GNSS module 1524, the NFC module 1525, or the MST module 1526 may include a processor for processing data exchanged through a corresponding module, for example. According to an embodiment, at least a part (e.g., two or more) of the cellular module 1521, the Wi-Fi module 1522, the BT module 1523, the GNSS module 1524, the NFC module 1525, or the MST module 1526 may be included within one Integrated Circuit (IC) or an IC package.

For example, the RF module 1527 may transmit and receive a communication signal (e.g., an RF signal). For example, the RF module 1527 may include a transceiver, a power amplifier module (PAM), a frequency filter, a low noise amplifier (LNA), an antenna, or the like. According to another embodiment, at least one of the cellular module 1521, the Wi-Fi module 1522, the BT module 1523, the GNSS module 1524, the NFC module 1525, or the MST module 1526 may transmit and receive an RF signal through a separate RF module.

The subscriber identification module 1529 may include, for example, a card and/or embedded SIM that includes a subscriber identification module and may include unique identify information (e.g., integrated circuit card identifier (ICCID)) or subscriber information (e.g., integrated mobile subscriber identity (MI)).

The memory 1530 (e.g., the memory 1430) may include an internal memory 1532 or an external memory 1534. For example, the internal memory 1532 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM
(PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1534 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1534 may be operatively and/or physically connected to the electronic device 1501 through various interfaces.

A security module 1536 may be a module that includes a storage space of which a security level is higher than that of the memory 1530 and may be a circuit that guarantees safe data storage and a protected execution environment. The security module 1536 may be implemented with a separate circuit and may include a separate processor. For example, the security module 1536 may be in a smart chip or a secure digital (SD) card, which is removable, or may include an embedded secure element (eSE) embedded in a fixed chip of the electronic device 1501. Furthermore, the security module 1536 may operate based on an operating system (OS) that is different from the OS of the electronic device 1501. For example, the security module 1536 may operate based on java card open platform (JCOP) OS.

The sensor module 1540 may measure, for example, a physical quantity or may detect an operation state of the electronic device 1501. The sensor module 1540 may convert the measured or detected information to an electric signal. For example, the sensor module 1540 may include at least one of a gesture sensor 1540A, a gyro sensor 1540B, a barometric pressure sensor 1540C, a magnetic sensor 1540D, an acceleration sensor 1540E, a grip sensor 1540F, the proximity sensor 1540G, a color sensor 1540H (e.g., red, green, blue (RGB) sensor), a biometric sensor 1540I, a temperature/humidity sensor 1540J, an illuminance sensor 1540K, or an UV sensor 1540M. Although not illustrated, additionally or generally, the sensor module 1540 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1540 may further include a control circuit for controlling at least one or more sensors included therein. According to an embodiment, the electronic device 1501 may further include a processor that is a part of the processor 1510 or independent of the processor 1510 and is configured to control the sensor module 1540. The processor may control the sensor module 1540 while the processor 1510 remains at a sleep state.

The input device 1550 may include, for example, a touch panel 1552, a (digital) pen sensor 1554, a key 1556, or an ultrasonic input unit 1558. For example, the touch panel 1552 may use at least one of capacitive, resistive, infrared and ultrasonic detecting methods. Also, the touch panel 1552 may further include a control circuit. The touch panel 1552 may further include a tactile layer to provide a tactile reaction to a user.

The (digital) pen sensor 1554 may be, for example, a part of a touch panel or may include an additional sheet for recognition. The key 1556 may include, for example, a physical button, an optical key, a keypad, or the like. The ultrasonic input device 1558 may detect (or sense) an ultrasonic signal, which is generated from an input device, through a microphone (e.g., a microphone 1588) and may check data corresponding to the detected ultrasonic signal.

The display 1560 (e.g., the display 1460) may include a panel 1562, a hologram device 1564, or a projector 1566. The panel 1562 may be the same as or similar to the display 1460 illustrated in FIG. 14. The panel 1562 may be implemented, for example, to be flexible, transparent or wearable. The panel 1562 and the touch panel 1552 may be integrated into a single module. The hologram device 1564 may display a stereoscopic image in a space using a light interference phenomenon. The projector 1566 may project light onto a screen so as to display an image. For example, the screen may be arranged in the inside or the outside of the electronic device 1501. According to an embodiment, the display 1560 may further include a control circuit for controlling the panel 1562, the hologram device 1564, or the projector 1566.

The interface 1570 may include, for example, a high-definition multimedia interface (HDMI) 1572, a universal serial bus (USB) 1574, an optical interface 1576, or a D-subminiature (D-sub) 1578. The interface 1570 may be included, for example, in the communication interface 1470 illustrated in FIG. 14. Additionally or generally, the interface 1570 may include, for example, a mobile high definition link (MHL) interface, a SD card/multi-media card (MMC) interface, or an infrared data association (IrDA) standard interface.

The audio module 1580 may convert a sound and an electric signal in dual directions. At least a part of the audio module 1580 may be included, for example, in the input/output interface 1450 illustrated in FIG. 14. The audio module 1580 may process, for example, sound information that is input or output through a speaker 1582, a receiver 1584, an earphone 1586, or the microphone 1588.

For example, the camera module 1591 may shoot a still image or a video. According to an embodiment, the camera module 1591 may include at least one or more image sensors (e.g., a front sensor or a rear sensor), a lens, an image signal processor (ISP), or a flash (e.g., an LED or a xenon lamp).

The power management module 1595 may manage, for example, power of the electronic device 1501. According to an embodiment, a power management integrated circuit (PMIC), a charger IC, or a battery or fuel gauge may be included in the power management module 1595. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1596 and a voltage, current or temperature thereof while the battery is charged. The battery 1596 may include, for example, a rechargeable battery and/or a solar battery.

The indicator 1597 may display a specific state of the electronic device 1501 or a part thereof (e.g., the processor 1510), such as a booting state, a message state, a charging state, and the like. The motor 1598 may convert an electrical signal into a mechanical vibration and may generate the following effects: vibration, haptic, and the like. Although not illustrated, a processing device (e.g., a GPU) for supporting a mobile TV may be included in the electronic device 1501. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 16:
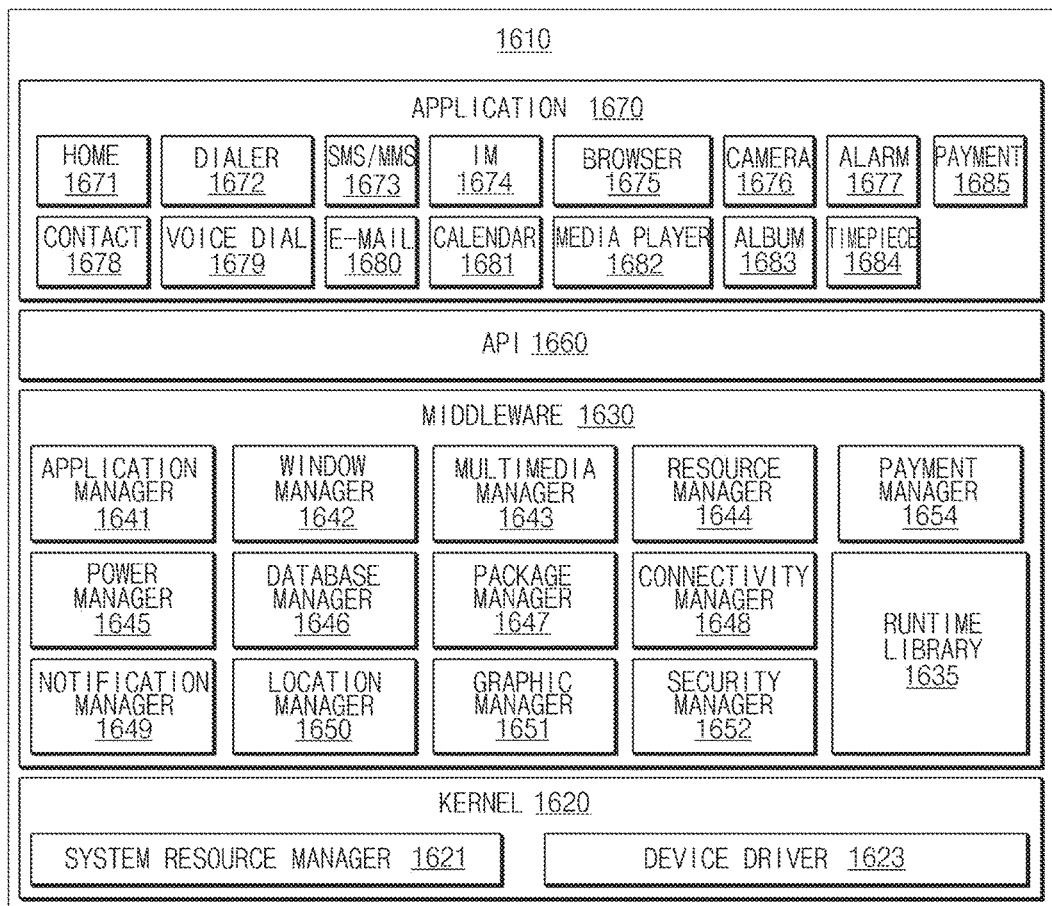
FIG. 16 illustrates a block diagram of a program module, according to various embodiments.

FIG. 16 illustrates a block diagram of a program module, according to various embodiments.

According to an embodiment, a program module 1610 (e.g., the program 1440) may include an operating system (OS) to control resources associated with an electronic device (e.g., the electronic device 1401), and/or diverse applications (e.g., the application program 1447) driven on the OS. The OS may be, for example, Android, iOS, Windows, Symbian, or Tizen.

The program module 1610 may include a kernel 1620, a middleware 1630, an application programming interface (API) 1660, and/or an application 1670. At least a portion of the program module 1610 may be preloaded on an electronic device or may be downloadable from an external electronic device (e.g., the electronic device 1402 or 1404, the server 1406, or the like).

The kernel 1620 (e.g., the kernel 1441) may include, for example, a system resource manager 1621 or a device driver 1623. The system resource manager 1621 may perform control, allocation, or retrieval of system resources. According to an embodiment, the system resource manager 1621 may include a process managing unit, a memory managing unit, or a file system managing unit. The device driver 1623 may include, for example, a display driver, a camera driver, a Bluetooth driver, a shared memory driver, a USB driver, a keypad driver, a Wi-Fi driver, an audio driver, or an inter-process communication (IPC) driver.

The middleware 1630 may provide, for example, a function that the application 1670 needs in common, or may provide diverse functions to the application 1670 through the API 1660 to allow the application 1670 to efficiently use limited system resources of the electronic device. According to an embodiment, the middleware 1630 (e.g., the middleware 1443) may include at least one of a runtime library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 1651, a security manager 1652, or a payment manager 1654.

The runtime library 1635 may include, for example, a library module that is used by a compiler to add a new function through a programming language while the application 1670 is being executed. The runtime library 1635 may perform input/output management, memory management, or capacities about arithmetic functions.

The application manager 1641 may manage, for example, a life cycle of at least one application of the application 1670. The window manager 1642 may manage a graphic user interface (GUI) resource that is used in a screen. The multimedia manager 1643 may identify a format necessary for playing diverse media files, and may perform encoding or decoding of media files by using a codec suitable for the format. The resource manager 1644 may manage resources such as a storage space, memory, or source code of at least one application of the application 1670.

The power manager 1645 may operate, for example, with a basic input/output system (BIOS) to manage a battery or power, and may provide power information for an operation of an electronic device. The database manager 1646 may generate, search for, or modify database that is to be used in at least one application of the application 1670. The package manager 1647 may install or update an application that is distributed in the form of package file.

The connectivity manager 1648 may manage, for example, wireless connection such as Wi-Fi or Bluetooth. The notification manager 1649 may display or notify an event such as arrival message, appointment, or proximity notification in a mode that does not disturb a user. The location manager 1650 may manage location information about an electronic device. The graphic manager 1651 may manage a graphic effect that is provided to a user, or manage a user interface relevant thereto. The security manager 1652 may provide a general security function necessary for system security, user authentication, or the like. According to an embodiment, if an electronic device (e.g., the electronic device 1401) includes a telephony function, the middleware 1630 may further include a telephony manager for managing a voice or video call function of the electronic device.

The middleware 1630 may include a middleware module that combines diverse functions of the above-described elements. The middleware 1630 may provide a module specialized to each OS kind to provide differentiated functions. Additionally, the middleware 1630 may dynamically remove a part of the preexisting elements or may add new elements thereto.

The API 1660 (e.g., the API 1445) may be, for example, a set of programming functions and may be provided with a configuration that is variable depending on an OS. For example, if an OS is Android or iOS, it may provide one API set per platform. If an OS is Tizen, it may provide two or more API sets per platform.

The application 1670 (e.g., the application program 1447) may include, for example, one or more applications capable of providing functions for a home 1671, a dialer 1672, an SMS/MMS 1673, an instant message (IM) 1674, a browser 1675, a camera 1676, an alarm 1677, a contact 1678, a voice dial 1679, an e-mail 1680, a calendar 1681, a media player 1682, an album 1683, and a timepiece 1684 or for offering health care (e.g., measuring an exercise quantity, blood sugar, or the like) or environment information (e.g., information of barometric pressure, humidity, temperature, or the like).

According to an embodiment, the application 1670 may include an application (hereinafter referred to as "information exchanging application" for descriptive convenience) to support information exchange between an electronic device (e.g., the electronic device 1401) and an external electronic device (e.g., the electronic device 1402 or 1404). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the information exchanging application may receive, for example, notification information from an external electronic device (e.g., the electronic device 1402 or 1404) and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device (e.g., the electronic device 1402 or 1404) which communicates with the electronic device, an application running in the external electronic device, or a service (e.g., a call service, a message service, or the like) provided from the external electronic device.

According to an embodiment, the application 1670 may include an application (e.g., a health care application of a mobile medical device) that is assigned in accordance with an attribute of an external electronic device (e.g., the electronic device 1402 or 1404). According to an embodiment, the application 1670 may include an application that is received from an external electronic device (e.g., the electronic device 1402 or 1404 or the server 1406). According to an embodiment, the application 1670 may include a preloaded application or a third party application that is downloadable from a server. The names of elements of the program module 1610 according to the embodiment may be modifiable depending on kinds of operating systems.

According to various embodiments, at least a portion of the program module 1610 may be implemented by software, firmware, hardware, or a combination of two or more thereof. At least a portion of the program module 1610 may be implemented (e.g., executed), for example, by the processor (e.g., the processor 1510). At least a portion of the program module 1610 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1420), may cause the one or more processors to perform a function corresponding to the instruction. The computer-readable storage media, for example, may be the memory 1430.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:
1. An electronic device comprising:
an antenna including a ground part, a feeding part, and a radiator;
a first switch interposed between the feeding part and the radiator; and a second switch configured to electrically connect or disconnect one point of a first path to or from the radiator, wherein a signal supplied through the feeding part is transmitted through the first path, a second path, or a third path that connects the feeding part to the radiator, wherein the first switch is configured to change a connection state of the second path and the third path, and wherein the third path includes a variable capacitor.

2. The electronic device of claim 1, wherein the antenna is a multi-band antenna that transmits and receives a signal of a first band through the radiator and transmits and receives a signal of a second band through the ground part.

3. The electronic device of claim 1, wherein an electrical length or a physical length of each of the first path, the second path, and the third path, through which the signal passes, is different from each other.

4. The electronic device of claim 3, wherein the electrical length of the first path is longer than the electrical length of the second path, and wherein the electrical length of the second path is longer than the electrical length of the third path.

5. The electronic device of claim 1, wherein electrical lengths or physical lengths of the first path, the second path, and the third path are determined based on a resonance frequency of the antenna.

6. The electronic device of claim 1, wherein an electrical length of the third path is changed depending on capacitance of the variable capacitor.

7. The electronic device of claim 1, wherein a resonance frequency of the antenna is changed depending on capacitance of the variable capacitor.

8. The electronic device of claim 1, wherein electrical lengths of the first path, the second path, the third path, and a fourth path including the second switch through which the signal passes are different from each other.

9. The electronic device of claim 8, wherein the electrical length of the first path is longer than the electrical length of the fourth path, wherein the electrical length of the fourth path is longer than the electrical length of the second path, and wherein the electrical length of the second path is longer than the electrical length of the third path.

10. The electronic device of claim 8, further comprising:

a controller configured to control the second switch such that the feeding part is connected to the radiator through the fourth path.

11. The electronic device of claim 1, further comprising:

a controller configured to control the first switch such that the feeding part is selectively connected to the second path or the third path.

12. The electronic device of claim 1, further comprising:

a controller configured to change capacitance of the variable capacitor.

13. The electronic device of claim 12, further comprising:

a communication processor electrically connected to the controller, wherein the communication processor is configured to change the capacitance of the variable capacitor using the controller in consideration of a communication state of the antenna.

14. The electronic device of claim 13, wherein the communication processor is configured to change the capacitance of the variable capacitor using the controller, if a dielectric contacts the radiator.

* * * * *